(12) United States Patent
Ragupathy et al.

(10) Patent No.: US 12,430,112 B2
(45) Date of Patent: Sep. 30, 2025

(54) DISTROLESS MICROSERVICE FOR SMALL FOOTPRINT TARGETS

(71) Applicant: Infinera Corp., San Jose, CA (US)

(72) Inventors: Prashaanth Ragupathy, San Francisco, CA (US); Yatindra Chugh, Sunnyvale, CA (US); Ramanujan Puranam, San Jose, CA (US); Madhumita Pal, San Jose, CA (US)

(73) Assignee: Infinera Corp.

( * ) Notice: Subject to any disclaimer, the term of this patent is extended or adjusted under 35 U.S.C. 154(b) by 0 days.

(21) Appl. No.: 17/841,173

(22) Filed: Jun. 15, 2022

(65) Prior Publication Data

US 2022/0398081 A1    Dec. 15, 2022

Related U.S. Application Data

(60) Provisional application No. 63/210,541, filed on Jun. 15, 2021.

(51) Int. Cl.
*G06F 8/61* (2018.01)
*G06F 9/445* (2018.01)

(52) U.S. Cl.
CPC ............... *G06F 8/63* (2013.01); *G06F 9/445* (2013.01)

(58) Field of Classification Search
CPC .................................. G06F 8/63; G06F 9/445
USPC .................................................. 717/120–178
See application file for complete search history.

(56) References Cited

U.S. PATENT DOCUMENTS

| | | | | |
|---|---|---|---|---|
| 6,643,843 | B1 * | 11/2003 | Reger ................... | G06F 8/654 717/172 |
| 7,886,021 | B2 * | 2/2011 | Scheifler ............... | G06F 9/5072 709/217 |
| 8,448,170 | B2 * | 5/2013 | Wipfel ................... | H04L 63/14 718/1 |
| 9,134,986 | B2 * | 9/2015 | Ricci ..................... | G06F 8/61 |
| 10,152,211 | B2 * | 12/2018 | Koushik ................ | H04L 63/10 |
| 10,459,774 | B2 * | 10/2019 | Subramaniyan ...... | G06F 9/541 |
| 11,561,790 | B2 * | 1/2023 | Miedema ............... | G06F 8/60 |

(Continued)

OTHER PUBLICATIONS

Gedeon, Julien, et al. "What the fog? edge computing revisited: Promises, applications and future challenges." IEEE Access 7 (2019): pp. 152847-152878. (Year: 2019).*

(Continued)

*Primary Examiner* — Satish Rampuria

(57) ABSTRACT

Disclosed herein are network elements for use in a transport network. The network elements may comprise an embedded device and a computing device comprising a processor and a memory storing a container runtime that when executed causes the processor to initialize a runtime base layer, initialize a plurality of containers, and provide, to each of the containers, access to at least one common resource. The runtime base layer may comprise an operating system and one or more common resource. The embedded device may have one or more property affecting a function of the embedded device and one or more status. The operating system may lack a software distribution. The common resources may be based on a common requirement of at least two of the applications. Each of the containers may comprise a particular one of the applications and one or more unique resource based on a unique requirement of the particular one of the applications.

17 Claims, 4 Drawing Sheets

(56) References Cited

U.S. PATENT DOCUMENTS

| | | | | |
|---|---|---|---|---|
| 12,118,401 | B1* | 10/2024 | Mystetskyi | H04L 9/3213 |
| 12,124,561 | B2* | 10/2024 | Walsh | G06F 21/53 |
| 2016/0103980 | A1* | 4/2016 | Ricci | G06F 13/14 |
| | | | | 726/28 |
| 2019/0087161 | A1* | 3/2019 | Sathe | H04L 67/12 |
| 2022/0012077 | A1* | 1/2022 | Kumar | G06F 9/5077 |

OTHER PUBLICATIONS

Wu, Qiang, and Tilman Wolf. "Runtime task allocation in multicore packet processing systems." IEEE Transactions on Parallel and Distributed Systems 23.10 (2012): pp. 1934-1943. (Year: 2012).*

Asiatici, Mikhail, et al. "Virtualized execution runtime for FPGA accelerators in the cloud." Ieee Access 5 (2017): pp. 1900-1910. (Year: 2017).*

Hartung, Carl, et al. "Open data kit: tools to build information services for developing regions." Proceedings of the 4th ACM/IEEE international conference on information and communication technologies and development. 2010. pp. 1-12 (Year: 2010).*

Fraternali, Piero. "Tools and approaches for developing data-intensive web applications: a survey." ACM Computing Surveys (CSUR) 31.3 (1999): pp. 227-263. (Year: 1999).*

Wolverton, Ray W. "The cost of developing large-scale software." IEEE Transactions on Computers 100.6 (1974): pp. 615-636. (Year: 1974).*

Van Eijk, Koen, et al. "Constraint analysis for code generation: basic techniques and applications in Facts." ACM Transactions on Design Automation of Electronic Systems (TODAES) 5.4 (2000): pp. 774-793. (Year: 2000).*

Engels, Gregor, et al. "Building integrated software development environments. Part I: tool specification." ACM Transactions on Software Engineering and Methodology (TOSEM) 1.2 (1992): pp. 135-167. (Year: 1992).*

Pramanik, Pijush Kanti Dutta, et al. "Power consumption analysis, measurement, management, and issues: A state-of-the-art review of smartphone battery and energy usage." IEEE Access 7 (2019): pp. 182113-182172. (Year: 2019).*

* cited by examiner

DISTROLESS MICROSERVICE FOR SMALL FOOTPRINT TARGETS

CROSS-REFERENCE TO RELATED APPLICATION

This application claims the benefit of U.S. Provisional Patent Application No. 63/210,541, filed on Jun. 15, 2021, the entire content of which is hereby incorporated herein by reference in its entirety.

BACKGROUND

Developing software applications for resource-constrained embedded targets presents a number of difficulties for developers. During development, developers must set up a testing environment similar to that which will be on the embedded target, which can be burdensome. If a particular application requires a custom library to function properly, developers cannot add the custom library without affecting other applications, even if the other applications do not utilize the custom library at all. Updates that are common to each of the applications must be pushed to each of the applications, which can cause updates to be duplicative. During deployment, duplicative components can create a bloated update packages. Finally, during runtime, embedded targets are typically provided limited storage space, which must be utilized efficiently. Further, in-service updates to the embedded target affect each of the applications, which can be disruptive.

Currently, there are a number of widely available Linux distribution-managed base images for cloud-native applications (e.g., Centos7, Debian9, Debian10, Ubuntu16.04, Ubuntu18.04, etc.). However, for each of such base images, being managed by a full Linux distribution renders it mandatory that the base image is maintained with regular security patches. Further, the life cycles of such base images are inextricably tied to the life cycle of the Linux distribution itself. Further, such base images contain duplicative or unnecessary binaries and/or libraries (e.g., a package manager, a bloated runtime library, etc.), thus increasing the size of the base images themselves.

Therefore, a need exists for systems and methods for developing applications for resource-constrained embedded targets. It is to such systems and methods that the present disclosure is directed.

SUMMARY

The problems of developing applications for resource-constrained embedded targets are solved by leveraging virtualization and containerization to create a flexible development pipeline that decouples base layer development and testing from application development, uses distroless base layers for runtime images, and pushes common library and environment updates to all services and application from the base layers.

Described herein is a solution for developing embedded applications for constrained deployment targets using a cloud-native approach. The solution defines a formula for setting up development and deployment base layers which are independent of applications. That is, application development and deployment is platform-independent. Applications can be deployed on cloud infrastructure or an embedded target based on latency requirements.

The solution described what herein makes in-service upgrades of applications easy and seamless. According to the solution, updating each application does not affect the service of any other application, and the update is guaranteed to work within the resource constraints of the system. Further, the solution provides independent patches and software updates for applications to improve a user's experience of in-field updates.

The solution described herein defines application development practices for embedded devices that serve to mitigate and/or minimize security vulnerabilities. Further, the solution defines practices that decouple application development from deployment configurations. Legacy deployment configurations are typically dictated by the resource constraints of the embedded targets.

According to the solution described herein, applications may be run with distroless base images designed for a variety of different processor architectures (e.g., x86, x86-64, ARM, AArch64, and/or the like), all of which comply with a specification of the Open Container Initiative. Accordingly, applications can be run as rootless containers and/or daemonless containers without any extra resource utilization on the target.

In one aspect, in accordance with some implementations, the disclosure describes a network element, comprising: an embedded device having one or more property affecting a function of the embedded device and one or more status; a computing device comprising a processor and a non-transitory computer-readable medium storing a container runtime comprising processor-executable code that when executed causes the processor to: initialize a runtime base layer comprising an operating system and one or more common resource, the operating system lacking a software distribution, the one or more common resource based at least in part on a common requirement of at least two of a plurality of applications; initialize a plurality of containers, each of the plurality of containers comprising a particular one of the plurality of applications and one or more unique resource based at least in part on a unique requirement of the particular one of the plurality of applications; and provide, to each of the plurality of containers, access to at least one of the one or more common resource.

In another aspect, in accordance with some implementations, the disclosure describes a computer system, comprising: a processor; and a non-transitory computer-readable medium storing a deployment package comprising: a container runtime image; a plurality of container images, each of the plurality of container images comprising a particular one of a plurality of application binaries and one or more unique resource based at least in part on a unique requirement of the particular one of the plurality of application binaries; and a runtime base image comprising an operating system image and one or more common resource, the operating system image lacking a software distribution, the one or more common resource based least in part on a common requirement of at least two of the plurality of application binaries, and the runtime base image operable to provide, to each of the plurality of containers, access to at least one of the one or more common resource.

Implementations of the above techniques include methods, apparatus, systems, and computer program products. One such computer program product is suitably embodied in a non-transitory computer-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
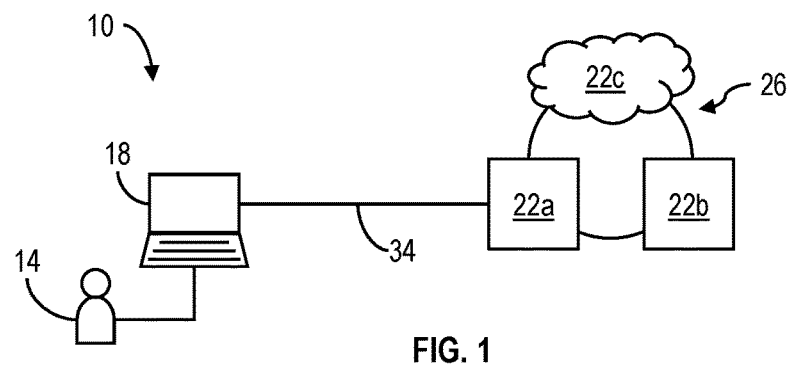
FIG. 1 is a diagram of an exemplary embodiment of a system for developing applications for resource-constrained embedded targets constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or." For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, e.g., by use of the antecedent "about," it will be understood that the particular value forms another embodiment. Reference to a particular numerical value includes at least that particular value unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable mediums may include random access memory (RAM), a read only memory (ROM), a CD-ROM, a hard drive, a solid-state drive, a flash drive, a memory card, a DVD-ROM, a BluRay Disk, a disk, an optical drive, combinations thereof, and/or the like.

Such non-transitory computer-readable mediums may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical lightpath. For example, an optical route may specify a path along which light is carried between two or more network entities.

Users of optical networks may want to determine information associated with the optical network. Optical network information may be difficult to obtain, aggregate, and display. Implementations described herein assist a user in obtaining and viewing aggregated optical network information, such as network information associated with network entities and optical links between the network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, "container" means a standalone, executable package of software that includes everything required by a system to execute an application (e.g., processor-executable code, a runtime system, system tools and libraries, and settings for the application).

As used herein, "daemon" means a software application that is executed as a background process, rather than being under the direct control of a user. An example of a daemon operable to manage containers is dockerd.

As used herein, "daemonless" means being capable of being executed without initializing a daemon to manage a container.

As used herein, "distribution" (or "distro") means an operating system package provided by a particular vendor. A distro generally includes a kernel (e.g., the Linux kernel), a package management application, and one or more software package.

As used herein, "distroless" means utilizing a container base layer that is not built out of a specific distribution.

As used herein, "image" means an immutable file comprising a filesystem required by a system to execute an application.

As used herein, "base image" means an image that has no parent image and is used as a template to create a container image.

As used herein, "microservice" means a single, loosely coupled, and independently executable application. Although the microservice on its own typically contributes to performing a single well-defined function, it is loosely coupled with other microservices to achieve the system functionality as a whole. While an application is a software process that is executed, a microservice typically comprises the software application and its deployment configuration and environment.

As used herein, "rootless container" means a container that is capable of being created, executed, and/or managed by a user without administrator privileges.

As used herein, "target" means a resource-constrained runtime environment.

Referring now to the drawings, and in particular to FIG. 1, shown therein is a diagram of an exemplary embodiment of a system 10 for developing applications for resource-constrained embedded targets constructed in accordance with the present disclosure. A user 14 may interact with the system 10 using a user device 18 that may be used to communicate with one or more network element 22 (hereinafter "network elements 22") of a transport network 26 (e.g., a first node 22a, a second node 22b, and/or a cloud-based server 22c), via a network 34.

In some embodiments, the cloud-based server 22c may comprise a processor and a memory having a data lake that may store copies of data such as sensor data, system data, metrics, logs, tracing, etc. in a raw format as well as transformed data that may be used for tasks such as reporting, visualization, analytics etc. The data lake may include structured data from relational databases, semi-structured data, unstructured data, time-series data, and binary data. The data lake may be a data base, a remote accessible storage, or a distributed file system.

In some embodiments, the network 34 may be the Internet and/or other network. For example, if the network 34 is the Internet, a primary user interface of the system 10 may be delivered through a series of web pages or private internal web pages of a company or corporation, which may be written in hypertext markup language, and accessible by the user device 18. It should be noted that the primary user interface of the system 10 may be another type of interface including, but not limited to, a Windows-based application, a tablet-based application, a mobile web interface, an application running on a mobile device, and/or the like.

The network 34 may be almost any type of network. For example, in some embodiments, the network 34 may be a version of an Internet network (e.g., exist in a TCP/IP-based network). In one embodiment, the network 34 is the Internet. It should be noted, however, that the network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

Optical network 26 may include any type of network that uses light as a transmission medium. For example, optical network 26 may include a fiber-optic based network, an optical transport network, a light-emitting diode network, a laser diode network, an infrared network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination thereof.

Figure 2:
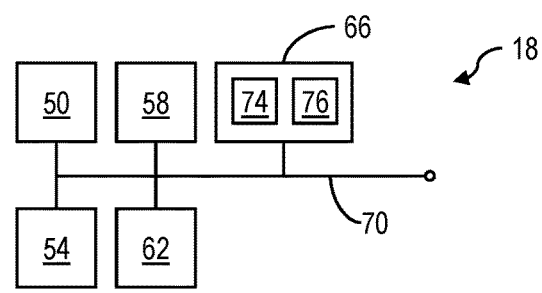
FIG. 2 is a diagram of an exemplary embodiment of a user device for use in the system of FIG. 1.

Referring now to FIG. 2, shown therein is a diagram of an exemplary embodiment of the user device 18 of the system 10 constructed in accordance with the present disclosure. In some embodiments, the user device 18 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the user device 18 may include one or more input device 50 (hereinafter "input device 50"), one or more output device 54 (hereinafter "output device 54"), one or more processor 58 (hereinafter "processor 58"), one or more communication device 62 (hereinafter "communication device 62") capable of interfacing with the network 34, one or more non-transitory computer-readable memory 66 (hereinafter "memory 66") storing processor-executable code and/or software application(s), for example including, a web browser capable of accessing a website and/or communicating information and/or data over a wireless or wired network (e.g., the network 34), and/or the like. The input device 50, output device 54, processor 58, communication device 62, and memory 66 may be connected via a path 70 such as a data bus that permits communication among the components of user device 18.

The memory 66 may store an application 74. In some embodiments, the application 74 when executed by the processor 58 may cause the user device 18 to perform an action such as communicate with or control one or more component of the user device 18 and/or the network 34. In some embodiments, the memory 66 may store one or more of a development stack 76, a deployment package 78, and a runtime package 246.

The input device 50 may be capable of receiving information input from the user 14 and/or processor 58, and transmitting such information to other components of the user device 18 and/or the network 34. The input device 50 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 54 may be capable of outputting information in a form perceivable by the user 14 and/or processor 58. For example, implementations of the output device 54 may include, but are not limited to, a computer monitor, a screen, a touchscreen, a speaker, a website, a television set, a smart phone, a PDA, a cell phone, a fax machine, a printer, a laptop computer, a haptic feedback generator, combinations thereof, and the like, for example. It is to be understood that in some exemplary embodiments, the input device 50 and the output device 54 may be implemented as a single device, such as, for example, a touchscreen of a computer, a tablet, or a smartphone. It is to be further understood that as used herein the term user (e.g., the user 14) is not limited to a human being, and may comprise a computer, a server, a website, a processor, a network interface, a user terminal, a virtual computer, combinations thereof, and/or the like, for example.

The network 34 may permit bi-directional communication of information and/or data between the user device 18 and the network elements 22 (e.g., the first node 22a, the second node 22b, and/or the cloud-based server 22c). The network 34 may interface with the user device 18 and/or the network elements 22 in a variety of ways. For example, in some embodiments, the network 34 may interface by optical and/or electronic interfaces, and/or may use a plurality of network topographies and/or protocols including, but not limited to, Ethernet, TCP/IP, circuit switched path, combinations thereof, and/or the like. The network 34 may utilize a variety of network protocols to permit bi-directional interface and/or communication of data and/or information between the user device 18 and/or the network elements 22.

Figure 3:
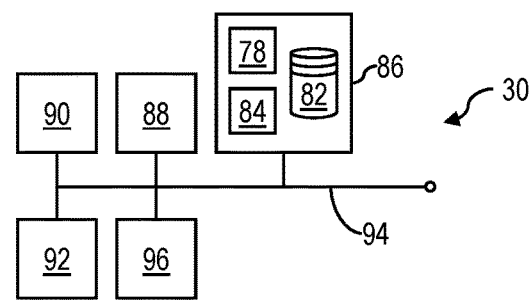
FIG. 3 is diagram of an exemplary embodiment of a cloud-based server for use in the system of FIG. 1.

Referring now to FIG. 3, shown therein is a diagram of an exemplary embodiment of a cloud-based server 22c constructed in accordance with the present disclosure. The cloud-based server 22c may include one or more devices that execute one or more microservice in a manner described herein. In the illustrated embodiment, the cloud-based server 22c is provided with one or more database 82 (hereinafter "database 82"), cloud server software 84, and one or more processor 88 (hereinafter "processor 88"). The cloud server software 84 and the database 82 are stored on a non-transitory computer-readable storage memory 86 (hereinafter "memory 86") accessible by the processor 88 of the cloud-based server 22c. In some embodiments, the memory 86 may further store one or more of a development stack 76, a deployment package 78, and a runtime package 246.

In some embodiments, the database 82 may be a time series database. The database 82 may be a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 82 can be centralized or distributed across multiple systems.

In some embodiments, the cloud server software 84 may include one or more microservice 140 (discussed below in more detail). As used herein, any microservice 140 stored in the memory 86 and being executed by the processor 88 may be referred to as a cloud-level service or a high-level service.

In some embodiments, the cloud-based server 22c may comprise one or more processor 88 working together, or independently to, execute processor-executable code, such as the cloud server software 84, stored on the memory 86. Additionally, each cloud-based server 22c may include at least one input device 90 (hereinafter "input device 90") and at least one output device 92 (hereinafter "output device 92"). Each element of the cloud-based server 22c may be partially or completely network-based or cloud-based, and may or may not be located in a single physical location.

The processor 88 may be implemented as a single processor or multiple processors working together, or independently, to execute the cloud server software 84 as described herein. It is to be understood, that in certain embodiments using more than one processor 88, the processors 88 may be located remotely from one another, located in the same location, or comprising a unitary multi-core processor. The processors 88 may be capable of reading and/or executing processor-executable code and/or capable of creating, manipulating, retrieving, altering, and/or storing data structures into the memory 86.

Exemplary embodiments of the processor 88 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 88 may be capable of communicating with the memory 86 via a path 94 (e.g., data bus). The processor 88 may be capable of communicating with the input device 90 and/or the output device 92.

The processor 88 may be further capable of interfacing and/or communicating with the user device 18 and/or the network elements 22 (e.g., the first node 22a, the second node 22b, and/or the cloud-based server 22c) via the network 34 using a communication device 96. For example, the processor 88 may be capable of communicating via the network 34 by exchanging signals (e.g., analog, digital, optical, and/or the like) via one or more ports (e.g., physical or virtual ports) using a network protocol to provide updated information to the application 74 executed on the user device 18.

The memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the cloud-based server 22c, and/or one or more memory 86 may be located remotely from the cloud-based server 22c. For example, the memory 86 may be located remotely from the cloud-based server 22c and communicate with the processor 88 via the network 34. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer-readable storage memory (i.e., one or more memory 86 may be partially or completely based on or accessed using the network 34).

The input device 90 of the cloud-based server 22c may transmit data to the processor 88 and may be similar to the input device 50 of the user device 18. The input device 90 may be located in the same physical location as the processor 88, or located remotely and/or partially or completely network-based. The output device 92 of the cloud-based server 22c may transmit information from the processor 88 to the user 12, and may be similar to the output device 54 of the user device 18. The output device 92 may be located with the processor 88, or located remotely and/or partially or completely network-based.

The memory 86 may store processor-executable code and/or information comprising the database 82 and cloud server software 84. In some embodiments, the cloud server software 84 may be stored as a data structure, such as the database 82 and/or data table, for example, or in non-data structure format such as in a non-compiled text file.

The network elements 22 (e.g., the first node 22a, the second node 22b, and/or the cloud-based server 22c) may include one or more devices that gather, process, store, and/or provide information in response to a request in a manner described herein. For example, the network elements 22 may include one or more optical data processing and/or traffic transfer devices, such as an optical node, an optical amplifier (e.g., a doped fiber amplifier, an erbium doped fiber amplifier, a Raman amplifier, etc.), an optical add-drop multiplexer ("OADM"), a reconfigurable optical add-drop multiplexer ("ROADM"), a flexibly reconfigurable optical add-drop multiplexer module ("FRM"), an optical source component (e.g., a laser source, or optical laser), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, the network elements 22 may include OADMs and/or ROADMs capable of being configured to add, drop, multiplex, and demultiplex optical signals. The network elements 22 may process and transmit optical signals to other network elements 22 throughout optical network 26 in order to deliver optical transmissions.

Layer 1 specific embodiments of the network element 22 may optionally be provided with additional elements that are not shown in the Figures such as an optical transceiver, a digital signal processor (DSP), and additional high-speed integrated circuit (ASIC or FPGA) that is specialized to handle high-speed data frames/packets.

Layer 0 specific embodiments of network element 22 may optionally be provided with additional elements that are not shown in the Figures such as a Wavelength Selective Switch (WSS), Variable Optical Attenuator (VOA), Erbium Doped Fiber Amplifier (EDFA), or Raman amplifiers, and optical channel monitors, for instance.

Figure 4:
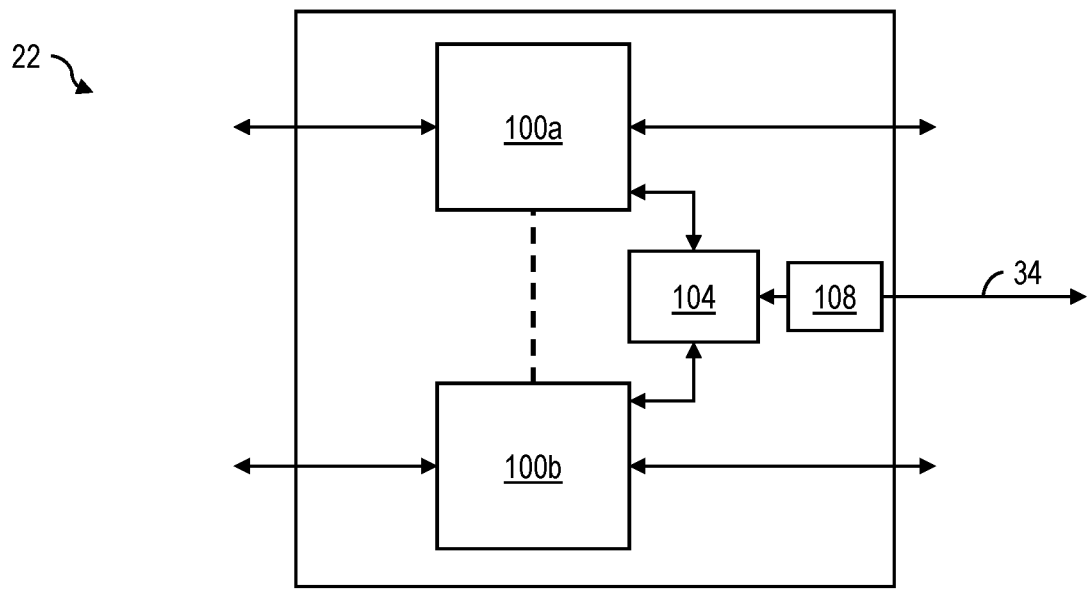
FIG. 4 is a diagram of an exemplary embodiment of a network element for use in the system of FIG. 1.

Referring now to FIG. 4, shown therein is a diagram of an exemplary embodiment of a network element 22, such as the first node 22*a* and/or the second node 22*b* of FIG. 1, constructed in accordance with the present disclosure. The network element 22 generally comprises an embedded device 100 (shown as embedded device 100*a* and embedded device 100*b*), a communication device 104 to allow one or more component of the network element 22 to communicate to one or more other component of the network element 22 or to another network element 22 in the system 10 via the network 34, and a controller card 108.

In one embodiment, the embedded device 100 includes one or more digital coherent optics module having one or more coherent optical transceiver operable to receive a client data from an electrical signal and transmit the client data in an optical signal and/or receive the client data from an optical signal and transmit the client data in an electrical signal, or a combination thereof. In one embodiment, the embedded device 100 may include one or more of the Layer 1 elements and/or Layer 0 elements as detailed above. The embedded optical device may have one or more property affecting a function of the embedded device and one or more status indicative of a current state of at least one component of the embedded device.

In accordance with the present disclosure, the network element 22 may be a holder, like a chassis, or a contained/logical equipment, like an optical line card within the chassis. In one embodiment, the network element 22 may be a logical entity comprising one or more chassis having one or more pluggable cards (such as one or more embedded device 100 and/or one or more controller card 108) that form the network element 22. For instance, pluggable cards may include traffic carrying ("data plane") cards (e.g., embedded device 100) that may have customized silicon such as ASICs or FPGAs that process the data plane frames/packets, based on the functionality of the card. Another exemplary traffic carrying card is a router line-card which has packet processing ASICs or other specialized silicon. Another exemplary embedded device 100 is an optical line card that includes a DSP module and/or optical photonic circuits. Pluggable cards may also refer to controller cards ("control and management plane") that do not process data packets but run all the software that implement the control plane (routing protocols) and management plane (management interfaces such as CLI, NETCONF, gRPC, DHCP etc.) such as the controller card 108. The controller card 108 typically has an off-the-shelf CPU (such as Intel or ARM) and run some variant of an operating system (more recently, Linux or QNX or BSD), described below in more detail. Other embedded devices 100 include common cards that may also be added such as fan trays, power entry modules, and others that provide auxiliary functions of the chassis.

It should be noted that the diagram of the network element 22 in FIG. 4 is simplified to include one controller card 108 in communication with multiple embedded devices 100. It is understood that the network element 22 may include more than one controller card 108, and each controller card 108 may be in communication with one or more embedded device 100 via the same or a different communication device 104.

The number of devices illustrated in FIG. 4 is provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Figure 5:
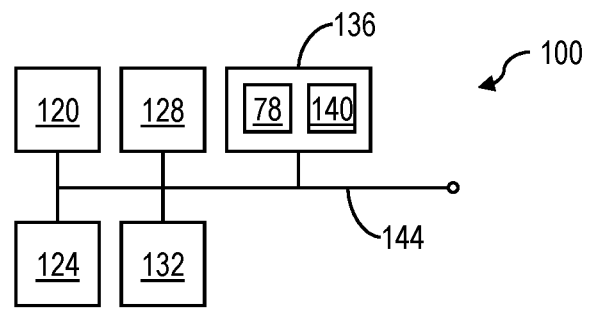
FIG. 5 is a diagram of an exemplary embodiment of an embedded device for use in the network element of FIG. 4.

Referring now to FIG. 5, shown therein is a diagram of an exemplary embodiment of the embedded device 100 constructed in accordance with the present disclosure. In some embodiments, the embedded device 100 may include, but is not limited to, one or more input device 120 (hereinafter "input device 120"), one or more output device 124 (hereinafter "output device 124"), one or more processor 128 (hereinafter "processor 128"), one or more communication device 132 (hereinafter "communication device 132") operable to interface with the communication device 104, one or more non-transitory computer-readable medium 136 (hereinafter "memory 136") storing processor-executable code and/or software application(s) (such as a microservice 140, described below in more detail). The input device 120, output device 124, processor 128, communication device 132, and memory 136 may be connected via a path 144 such as a data bus that permits communication among the components of the embedded device 100. In some embodiments, the memory 136 may further store one or more of a development stack 76, a deployment package 78, and a runtime package 246.

The input device 120 may be capable of receiving client data and transmitting the client data to other components of the system 10. The input device 120 may include, but is not limited to, implementation as an optical network interface, an electrical network interface, combinations thereof, and/or the like, for example.

The output device 124 may be capable of outputting client data. For example, implementations of the output device 124 may include, but are not limited to, implementation as an optical network interface, an electrical network interface, combinations thereof, and/or the like, for example.

As used herein, any microservice 140 stored in the memory 136 and being executed by the processor 128 may be referred to as a device-level service or low-level service.

Figure 6:
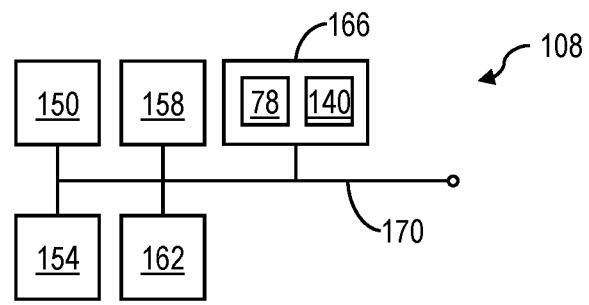
FIG. 6 is a diagram of an exemplary embodiment of a controller card for use in the embedded device of FIG. 5.

Referring now to FIG. 6, shown therein is a diagram of an exemplary embodiment of a controller card 108 constructed in accordance with the present disclosure. In some embodiments, the controller card 108 may include, but is not limited to, one or more input device 150 (hereinafter "input device 150"), one or more output device 154 (hereinafter "output device 154"), one or more processor 158 (hereinafter "processor 158"), one or more communication device 162 (hereinafter "communication device 162") operable to interface with the communication device 104, one or more non-transitory memory 166 (hereinafter "memory 166") storing processor-executable code and/or software application(s) (such as a microservice 140, described below in more detail). The input device 150, output device 154, processor 158, communication device 162, and memory 166 may be connected via a path 170 such as a data bus that permits communication among the components of the controller card 108. In some embodiments, the memory 166 may further store one or more of a development stack 76, a deployment package 78, and a runtime package 246.

The input device 150 may be capable of receiving client data and transmitting the client data to other components of the system 10. The input device 150 may include, but is not limited to, implementation as an optical network interface, an electrical network interface, combinations thereof, and/or the like, for example.

The output device 154 may be capable of outputting client data. For example, implementations of the output device 154 may include, but are not limited to, implementation as an optical network interface, an electrical network interface, combinations thereof, and/or the like, for example.

As used herein, any microservice 140 stored in the memory 166 and being executed by the processor 158 may be referred to as a node-level service or mid-level service.

Figure 7:
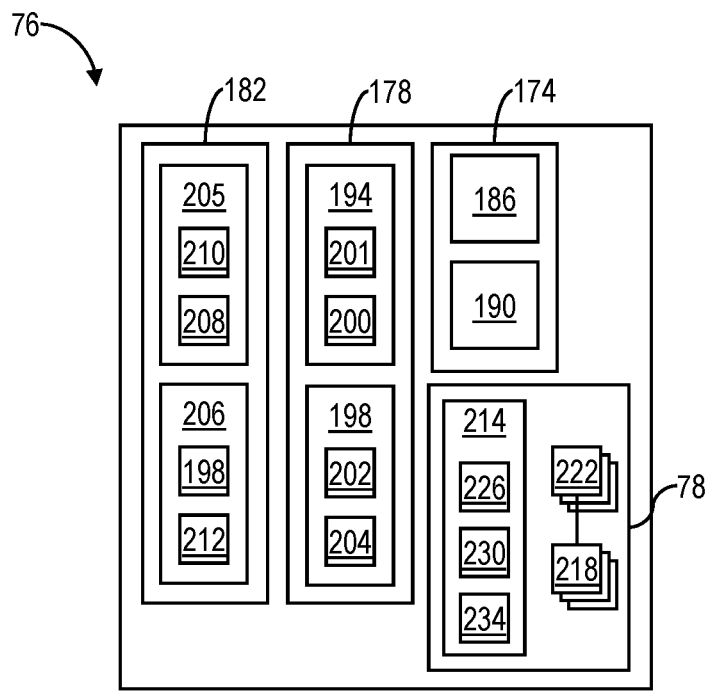
FIG. 7 is a diagram of an exemplary embodiment of a development stack for use in the system of FIG. 1.

Referring now to FIG. 7, shown therein is a diagram of an exemplary embodiment of a development stack 76 constructed in accordance with the present disclosure. In some embodiments, the development stack 76 may include, but is not limited to, a deployment package 78, a debug package 174, a build package 178, and a test package 182. In some embodiments, the debug package 174 may comprise one or more debug application binary 186 (hereinafter "debug application binaries 186") and a debug base image 190, each of which being stored as a separate container image layer.

A container image layer may comprise one or more file (e.g., libraries, binaries, configuration files, and/or the like), the container image layer created and/or manipulated by the container runtime 230 (to be discussed in greater detail below). Each container image layer may conform to a specification of the Open Container Initiative. Each container image may comprise a plurality of container image layers.

In some embodiments, the build package 178 may comprise an application build stage 194 and a build base image 198, each of which being stored as a separate container image layer. The application build stage 194 may comprise one or more build application binary 200 (hereinafter "build application binaries 200") and a build cache 201. The build base image 198 may include, but is not limited to, one or more build tool 202 (hereinafter "build tools 202") and one or more package manager 204 (hereinafter "package managers 204"). In some embodiments, the test package 182 may comprise an application test stage 205 and a test base image 206, each of which being stored as a separate container image layer. The application test stage 205 may comprise one or more test application binary 208 (hereinafter "test application binaries 208") and one or more test process 210 (hereinafter "test processes 210"). The test base image 206 may include, but is not limited to, a copy of the build base image 198 and one or more test tool 212 (hereinafter "test tools 212").

In some embodiments, the deployment package 78 may include, but is not limited to, a runtime base image 214, a plurality of container images 218a-n (hereinafter "container images 218"), and a plurality of application binaries 222 (hereinafter "application binaries 222"). Each of the container images 218 may comprise a particular one the application binaries 222.

In some embodiments, at least one of the plurality of container images 218a-n is at least one of a rootless container image and a daemonless container image.

The debug application binaries 186, the build application binaries 200, the test application binaries 208, and the application binaries 222 may comprise processor-executable code that when executed causes a processor (e.g., the processor 58, the processor 88, the processor 128, and/or the processor 158) to execute one or more software application.

One or more component of the debug package 174 (e.g., one or more of the debug application binaries 186 and/or the debug base image 190) may be configured for assisting a user 14 in identifying and/or removing errors from one or more application binary (e.g., the debug application binaries 186, the build application binaries 200, the test application binaries 208, and/or the application binaries 222). The debug application binaries 186 may comprise one or more debug tool (hereinafter "debug tools"). In some embodiments, the debug tools may include, for example, a GNU Project Debugger.

One or more component of the build package 178 (e.g., the application build stage 194, including the build application binaries 200 and/or the build cache 201, and/or the build base image 198, including the build tools 202 and/or the package managers 204) may be configured for assisting a user 14 in compiling, analyzing, and/or preparing for release one or more application binary (e.g., the debug application binaries 186, the build application binaries 200, the test application binaries 208, and/or the application binaries 222). In one embodiment, the build tools 202 may comprise, for example, GNU Compiler Collection, CMake, one or more C/C++ application, a Python interpreter, a Golang compiler, and/or the like. In one embodiment, the package managers may comprise, for example, an Advanced Packaging Tool, an Aptitude package manager, a Ret Hat package manager, a Pacman package manager, and/or the like.

One or more component of the test package 182 (e.g., the application test stage 205, including the test application binaries 208 and/or the test processes 210, and/or the test base image 206, including the copy of the build base image 198 and/or the test tools 212) may be configured for assisting a user 14 in executing one or more test on one or more application binary (e.g., the debug application binaries 186, the build application binaries 200, the test application binaries 208, and/or the application binaries 222).

Executing the one or more test may include, for example, applying one or more test framework (e.g., pytest, GoogleTest, CxxTest, and/or the like), and/or performing one or more test operable to exercise one or more code flow in the application binaries (e.g., the debug application binaries 186, the build application binaries 200, the test application binaries 208, and/or the application binaries 222) in order to verify functionality of the application binaries.

In some embodiments, the runtime base image 214 may be operable to be executed in a production environment and to execute the application binaries 222. In some embodiments, the runtime base image 214 may comprise an operating system image 226, a container runtime image 230, and one or more common resource 234 (hereinafter "common resources 234"), each of such components being stored as a separate container image layer. The operating system image 226 may correspond any operating system that is capable of performing the disclosed invention such as, for example, a Microsoft Windows operating system, a UNIX operating system, a Linux operating system, a Mac OS operating system, and/or the like. In some embodiments, the operating system image 226 of the present disclosure may lack a software distribution. As such, the operating system image 226 may be lightweight. In some embodiments, the runtime base image 214 may comprise only the minimum set of components (e.g., libraries, binaries, and/or the like) required for the application binaries 222. This may have the effect of ensuring that the application binaries 222 are optimally deployed in terms of consuming system resources.

The container runtime image 230 may correspond to any container runtime that is capable of performing the disclosed invention such as, for example, runC, containerd, Docker Engine, Windows Containers, Podman, and Kubernetes. The common resources 234 may include, but are not limited to, one or more runtime environment (e.g., a C/C++ runtime environment and/or a CPython runtime environment for an arm64 architecture and/or an x86 architecture), one or more memory allocator (e.g., a Jemalloc memory allocator), one or more container debugging utility (e.g., one or more BusyBox utility), one or more inter-process communication library (e.g., a protobuf library and/or a gRPC library), one or more database access library (e.g., a Redis client and/or a MySQL client), one or more software library (e.g., a C standard library), one or more logging library, one or more tracing library, one or more database client library, and/or the like. In some embodiments, one or more container image layer of the runtime base image 214 may be replaceable (e.g., with one or more container image layer of the debug base image 190, the build base image 198, and/or the test base image 206).

The development stack 76 may have the effect of decoupling application development from environment setup. That is, utilizing the development stack 76 described herein, a user 14 may adjust their development environment to suit their needs and reproduce builds using the same development environment easily. For instance, the user 14 may adjust their development environment to match the development environment of, for instance, the network element 22, the embedded device 100, or the controller card 108. Applications developed utilizing the development stack 76 may be operable to be executed on any processor architecture, the applications being only dependent on the container runtime image 230. In order to update one or more development environment, the user 14 may simply apply an update to the base images (i.e., the debug base image 190, the build base image 198, the test base image 206, and the runtime base image 214).

One or more of the base images (i.e., the debug base image 190, the build base image 198, the test base image 206, and the runtime base image 214) may be version-controlled separately from the application binaries (e.g., the debug application binaries 186, the build application binaries 200, the test application binaries 208, and/or the application binaries 222). Accordingly, developers may be able to concern themselves exclusively with vulnerabilities in the application binaries, as they will be scanned separately from the base images.

Figures 8, 9:
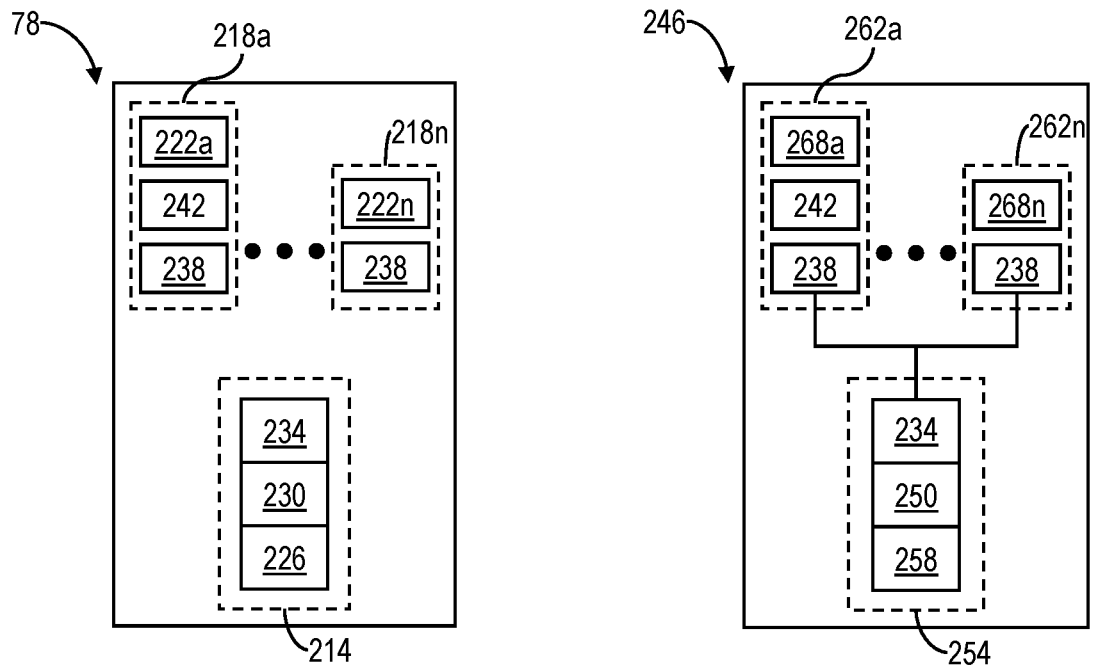
FIG. 8 is a diagram of an exemplary embodiment of a deployment package for use in the system of FIG. 1.
FIG. 9 is a diagram of an exemplary embodiment of a runtime package for use in the system of FIG. 1.

Now referring to FIG. 8, shown therein is a diagram of an exemplary embodiment of a deployment package 78 constructed in accordance with the present disclosure. The deployment package 78, as it is shown in FIG. 8, may be operable to be transmitted from the user device 18 to the cloud-based server 22c via the network 34, and to be retrieved by the network elements 22 (i.e., the first node 22a and/or the second node 22b) from the cloud-based server 22c via the network 34.

In some embodiments, the deployment package 78 may comprise only one runtime base image 214 common to each of the application binaries 222. Using a common runtime base image 214 lacking a software distribution may reduce the size of the deployment package 78 regardless of the number of application binaries 222 packaged in the deployment package 78. In some embodiments, prior to being transmitted from the user device 18 to the cloud-based server 22c via the network 34, the application binaries 222 may add to the deployment package 78 one or more unique resource 238 (hereinafter "unique resources 238"), the unique resources 238 being based on a unique requirement of the particular one of the application binaries 222 that added the unique resources 238 to the deployment package 78. Each of the unique resources 238 may be added to the deployment package 78 as an additional container image layer of one of the container images 218. The unique resources 238 may include, but are not limited to, one or more software library operable to assist a particular one of the application binaries 222 in performing one or more task unique to the particular one of the application binaries 222 (e.g., one or more device driver, one or more software development kit, and/or the like).

In some embodiments, the runtime base image 214 comprises one or more common container image layer. In some embodiments, the application binaries 222 may be operable to add one or more unique container image layer to the runtime base image 214, each of the one or more unique container image layer comprising at least one of the unique resources 238.

In some embodiments, the deployment package 78 comprises one or more environment update 242 (hereinafter "environment updates 242"). The environment updates 242 may correspond to a particular one of the application binaries 222 and may be maintained as a separate container image layer of one of the container images 218 such that the container image layers common to all applications (i.e., the runtime base image 214) remain unchanged until a base image update (not shown) to the runtime base image 214 is added to the deployment package 78.

Referring now to FIG. 9, shown therein is a diagram of an exemplary embodiment of a runtime package 246 constructed in accordance with the present disclosure. The container runtime image 230 may comprise processor-executable code corresponding to a container runtime 250, the container runtime 250 when executed by a processor (e.g., the processor 58, the processor 88, the processor 128, and/or the processor 158) causing the processor to initialize a runtime base layer 254. The runtime base layer 254 may include, but is not limited to, the container runtime 250, an operating system 258 corresponding to the operating system image 226, and the common resources 234. The container runtime 250 may further cause the processor to initialize a plurality of containers 262a-n (hereinafter "containers 262") corresponding to the container images 218, each of the containers 262 comprising a particular one of a plurality of applications 268a-n (hereinafter "applications 268"), each of the applications 268 corresponding to a particular one of the application binaries 222. Each of the containers 262 may further comprise the unique resources 238 for the application binaries 222 contained within the containers 262. Further, each of the containers 262 may comprise the environment updates 242.

The container runtime 250 may be configured to provide to each of the containers 262 access to the common resources 234 required by the particular container 262. In some embodiments, the access to the common resources is read-only access to the common resources 234.

Figure 10:
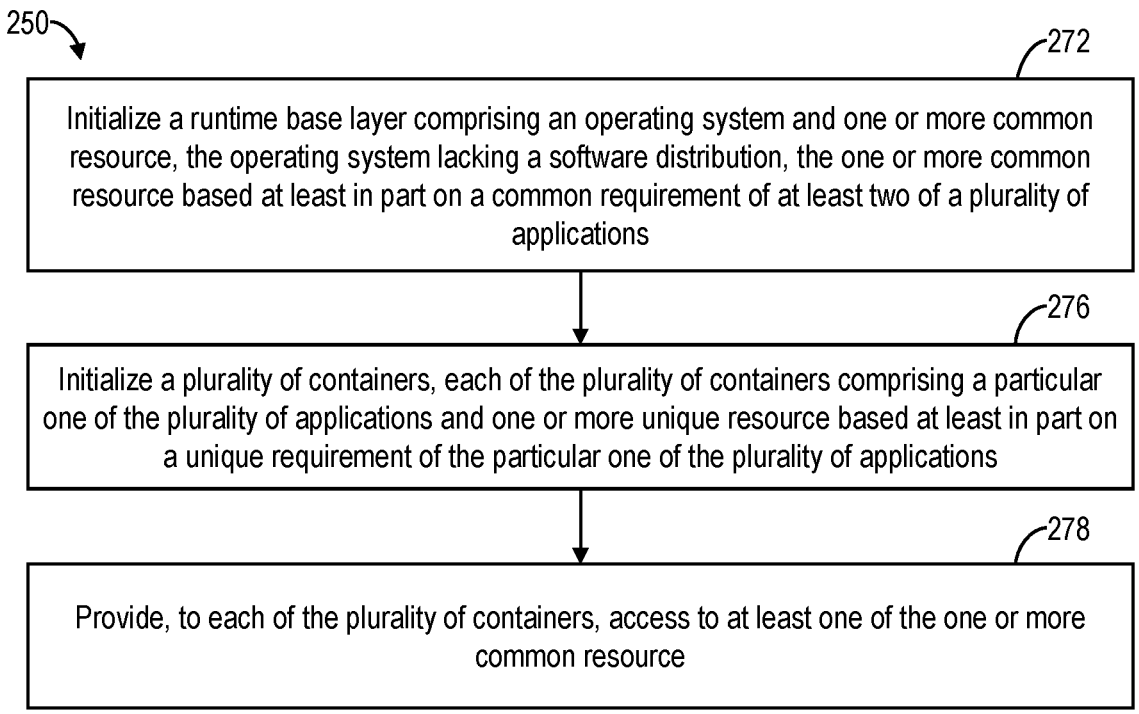
FIG. 10 is a process flow diagram of an exemplary embodiment of a container runtime for use in the system of FIG. 1.

Referring now to FIG. 10, shown therein is a process flow diagram of an exemplary embodiment of a container runtime 250 constructed in accordance with the present disclosure. In some embodiments, the container runtime 250 may comprise processor-executable code that when executed causes a processor (e.g., the processor 58, the processor 88, the processor 128, and/or the processor 158) to: initialize a runtime base layer comprising an operating system 258 and one or more common resource 234 (step 272); initialize a plurality of containers 262a-n (step 276). In some embodiments, the operating system 258 may lack a software distribution. In some embodiments, the common resources 234 may be based at least in part on a common requirement of at least two of a plurality of applications 268a-n.

In some embodiments the container runtime 250 may comprise processor-executable code that when executed causes a processor (e.g., the processor 58, the processor 88, the processor 128, and/or the processor 158) to: provide, to each of the plurality of containers 262a-n, access to at least one of the one or more common resource 234 (step 278). In some embodiments, each of the plurality of containers 262a-n may comprise a particular one of the plurality of applications 268a-n and one or more unique resource 238 based at least in part on a unique requirement of the particular one of the plurality of applications 268a-n.

In some embodiments, the one or more common resource may comprise at least one of a runtime environment, a memory allocator, a debug utility, and one or more common library. In some embodiments, the one or more unique resource 238 may comprise at least one of at least one of a runtime environment, a memory allocator, a debug utility, and one or more unique library.

In some embodiments, at least one of the plurality of containers 262a-n is at least one of a rootless container and a daemonless container. In some embodiments, at least one of the plurality of containers comprises a plurality of container layers. In some embodiments, one or more component of the runtime package 246 confirms to a Runtime Specification of an Open Container Initiative. In some embodiments, the container runtime 250 is one of Docker Engine and Kubernetes.

Figure 11:
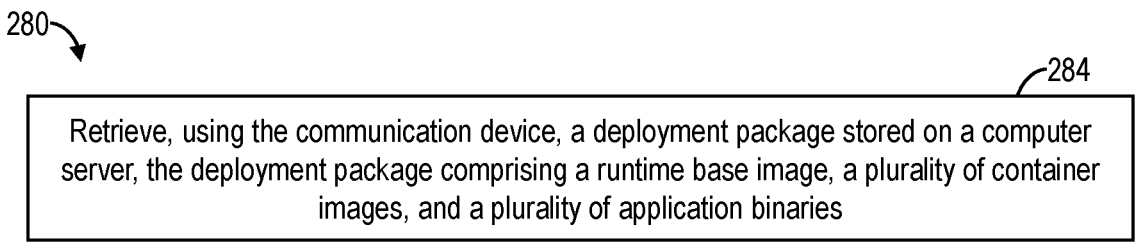
FIG. 11 is a process flow diagram of an exemplary embodiment of a pull method for use in the system of FIG. 1.

Referring now to FIG. 11, shown therein is a process flow diagram of an exemplary embodiment of a pull method 280 in accordance with the present disclosure. In some embodiments, the pull method 280 may further comprise processor-executable code that when executed causes a processor (e.g., the processor 58, the processor 88, the processor 128, and/or the processor 158) to retrieve, using a communication device (e.g., the communication device 62, the communication device 96, the communication device 104, the communication device 132, and/or the communication device 162), a deployment package 78 stored on a cloud-based server 22c (step 284).

In some embodiments, the deployment package 78 may comprise a runtime base image 214, a plurality of container images 218a-n, and plurality of application binaries 222a-n. Accordingly, in some embodiments, the runtime base layer 254, the plurality of containers 262a-n, and the plurality of applications 268a-n may be based at least in part on the runtime base image 214, the plurality of container images 218a-n, and the plurality of application binaries 222a-n, respectively. In some embodiments, the deployment package 78 further comprises one or more environment update 242, and the container runtime 250 further comprises processor-executable code that when executed causes a processor (e.g., the processor 58, the processor 88, the processor 128, and/or the processor 158) to apply the one or more environment update 242 to at least one of the plurality of containers 262a-n.

Figure 12:
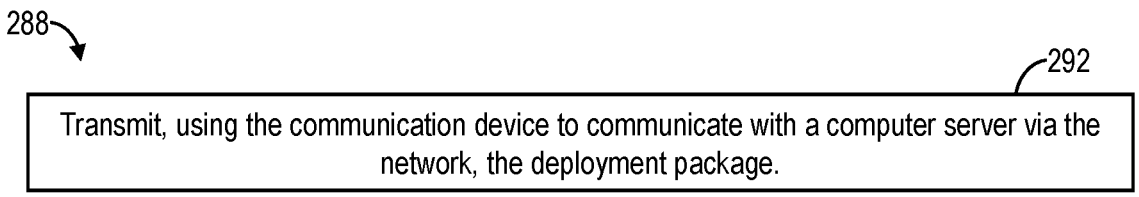
FIG. 12 is a process flow diagram of an exemplary embodiment of a push method for use in the system of FIG. 1.

Referring now to FIG. 12, shown therein is a process flow diagram of a push method 288 constructed in accordance with the present disclosure. In some embodiments, the push method 288 comprises processor-executable code when executed causes a processor (e.g., the processor 58, the processor 88, the processor 128, and/or the processor 158) to transmit, using a communication device (e.g., the communication device 62, the communication device 96, the communication device 104, the communication device 132, and/or the communication device 162) to communicate with a cloud-based server 22c via the network 34, the deployment package 78.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:
an embedded device having one or more property affecting a function of the embedded device and one or more status, the embedded device including a coherent optical transceiver that transmits data over an optical signal;
a computing device comprising a processor and a non-transitory computer-readable medium storing a container runtime comprising processor-executable code, the processor configured to control the coherent optical transceiver, wherein the processor-executable code, when executed by the processor, causes the processor to:
retrieve a deployment package stored on a computer server, the deployment package comprising a distroless runtime base image, a plurality of container images, and a plurality of application binaries corresponding to a plurality of applications;
initialize a distroless runtime base layer based at least in part on the distroless runtime base image, the distroless runtime base layer comprising an operating system and one or more common resource, the operating system lacking a software distribution, the one or more common resource based at least in part on a common requirement of at least two of the plurality of applications;
initialize a plurality of containers based at least in part on a particular one of the plurality of container images, each of the plurality of containers comprising a particular one of the plurality of applications and one or more unique resource based at least in part on a unique requirement of the particular one of the plurality of applications; and provide, to each of the plurality of containers, access to at least one of the one or more common resource;

wherein the one or more unique resource comprises at least one of one or more device driver, one or more software development kit, and one or more software library.

2. The network element of claim 1, further comprising a communication device configured to communicate with the processor and to communicate via a network, wherein retrieving the deployment package stored on the computer server is further defined as retrieving, using the communication device, the deployment package stored on the computer server.

3. The network element of claim 1, wherein the deployment package further comprises one or more environment update, and the container runtime further comprises processor-executable code that when executed causes the processor to apply the one or more environment update to at least one of the plurality of containers.

4. The network element of claim 1, wherein at least one of the plurality of containers is at least one of a rootless container and a daemonless container.

5. The network element of claim 1, wherein at least one of the plurality of containers comprises a plurality of container layers.

6. The network element of claim 1, wherein one or more component of the container runtime conforms to a Runtime Specification of an Open Container Initiative.

7. The network element of claim 1, wherein the container runtime is one of Docker Engine, runC, containerd, Windows Containers, Podman, and Kubernetes.

8. A computer system, comprising:
a processor; and
a non-transitory computer-readable medium storing processor-executable instructions that, when executed by the processor, cause the processor to:
generate a deployment package comprising:
a container runtime image;
a plurality of container images, each of the plurality of container images comprising a particular one of a plurality of application binaries and one or more unique resource based at least in part on a unique requirement of the particular one of the plurality of application binaries; and
a distroless runtime base image comprising an operating system image and one or more common resource, the operating system image lacking a software distribution, the one or more common resource based at least in part on a common requirement of at least two of the plurality of application binaries, and the distroless runtime base image configured to provide, to each of the plurality of container images, access to at least one of the one or more common resource;
wherein the one or more unique resource comprises at least one of one or more device driver, one or more software development kit, and one or more software library; and
transmit the deployment package to a computer server.

9. The computer system of claim 8, wherein the access to the at least one of the one or more common resource is read-only access to the at least one of the one or more common resource.

10. The computer system of claim 8, further comprising a communication device configured to communicate with the processor and to communicate via a network, wherein transmitting the deployment package to the computer server is further defined as transmitting, using the communication device, the deployment package to the computer server.

11. The computer system of claim 8, wherein the deployment package further comprises one or more environment update that is to be applied to the distroless runtime base image.

12. The computer system of claim 8, wherein at least one of the plurality of container images is at least one of a rootless container image and a daemonless container image.

13. The computer system of claim 8, wherein at least one of the plurality of container images comprises a plurality of container image layers.

14. The computer system of claim 8, wherein the deployment package conforms to an Image Specification of an Open Container Initiative.

15. The computer system of claim 8, wherein the container runtime image is one of a Docker Engine image, a runC image, a containerd image, a Windows Containers image, a Podman image, and a Kubernetes image.

16. A network element, comprising:
an embedded device having one or more property affecting a function of the embedded device and one or more status, the embedded device including a coherent optical transceiver configured to transmit data over an optical signal;
a computing device comprising a processor, a communication device configured to communicate with the processor and with a computer server via a network, and a non-transitory computer-readable medium storing a container runtime comprising processor-executable code, the processor controlling the coherent optical transceiver, wherein the processor-executable code that, when executed by the processor, causes the processor to:
retrieve, using the communication device, a deployment package stored on the computer server, the deployment package comprising a distroless runtime base image, a plurality of container images, and a plurality of application binaries corresponding to a plurality of applications;
initialize a distroless runtime base layer based at least in part on the distroless runtime base image, the distroless runtime base layer comprising an operating system and one or more common resource, the operating system lacking a software distribution, the one or more common resource based at least in part on a common requirement of at least two of the plurality of applications;
initialize a plurality of containers based at least in part on a particular one of the plurality of container images, each of the plurality of containers comprising a particular one of the plurality of applications and one or more unique resource based at least in part on a unique requirement of the particular one of the plurality of applications; and
provide, to each of the plurality of containers, access to at least one of the one or more common resource;
wherein the one or more common resource comprises at least one of a runtime environment, a memory allocator, a container debugging utility, one or more inter-process communication library, one or more database access library, one or more logging library, one or more tracing library, one or more database client library, and one or more software library.

17. A computer system, comprising:
a processor;
a communication device configured to communicate with the processor and with a computer server via a network; and
a non-transitory computer-readable medium storing processor-executable instructions that, when executed by the processor, cause the processor to:
generate a deployment package, comprising:
- a container runtime image;
- a plurality of container images, each of the plurality of container images comprising a particular one of a plurality of application binaries and one or more unique resource based at least in part on a unique requirement of the particular one of the plurality of application binaries; and
- a distroless runtime base image comprising an operating system image and one or more common resource, the operating system image lacking a software distribution, the one or more common resource based at least in part on a common requirement of at least two of the plurality of application binaries, and the distroless runtime base image configured to provide, to each of the plurality of container images, access to at least one of the one or more common resource;

wherein the one or more common resource comprises at least one of a runtime environment, a memory allocator, a container debugging utility, one or more inter-process communication library, one or more database access library, one or more logging library, one or more tracing library, one or more database client library, and one or more software library; and transmit, using the communication device, the deployment package to the computer server.

* * * * *